United States Patent
Singla et al.

(10) Patent No.: US 10,296,739 B2
(45) Date of Patent: May 21, 2019

(54) EVENT CORRELATION BASED ON CONFIDENCE FACTOR

(71) Applicant: HEWLETT-PACKARD DEVELOPMENT COMPANY, L.P., Houston, TX (US)

(72) Inventors: Anurag Singla, Sunnyvale, CA (US); Robert Block, Sunnyvale, CA (US); Suranjan Pramanik, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 252 days.

(21) Appl. No.: 14/773,983

(22) PCT Filed: Mar. 11, 2013

(86) PCT No.: PCT/US2013/030225
§ 371 (c)(1),
(2) Date: Sep. 9, 2015

(87) PCT Pub. No.: WO2014/142791
PCT Pub. Date: Sep. 18, 2014

(65) Prior Publication Data
US 2016/0019388 A1    Jan. 21, 2016

(51) Int. Cl.
*H04L 29/06* (2006.01)
*G06F 21/55* (2013.01)

(52) U.S. Cl.
CPC ........ *G06F 21/552* (2013.01); *H04L 63/1416* (2013.01)

(58) Field of Classification Search
CPC .......................... G06F 21/552; H04L 63/1416
See application file for complete search history.

(56) References Cited

U.S. PATENT DOCUMENTS

| | | | |
|---|---|---|---|
| 5,440,738 A | 8/1995 | Bowman et al. | |
| 6,330,547 B1 | 12/2001 | Martin | |
| 6,574,583 B1 | 6/2003 | Brossette et al. | |
| 7,908,657 B1 * | 3/2011 | Hernacki | G06F 21/554 713/151 |
| 8,079,083 B1 * | 12/2011 | Bennett | H04L 63/1416 726/23 |
| 8,621,618 B1 * | 12/2013 | Ramsey | H04L 63/1408 370/392 |

(Continued)

FOREIGN PATENT DOCUMENTS

| KR | 2011-0024287 A | 3/2011 | |
|---|---|---|---|
| WO | WO-2013/019198 A1 | 2/2013 | |
| WO | WO 2013019198 A1 * | 2/2013 | ............. G06F 21/56 |

OTHER PUBLICATIONS

International Search Report & Written Opinion, dated Dec. 26, 2013, PCT Patent Application No. PCT/US2013/030225, 9 pages.

(Continued)

*Primary Examiner* — David J Pearson

(57) ABSTRACT

According to an example, a confidence factor function may be applied to determine a confidence factor for a condition of a rule to correlate events. The confidence factor may be an approximation of whether an event or a set of events satisfies the condition in the rule. The confidence factor may be compared to a threshold to determine whether the condition is satisfied.

20 Claims, 4 Drawing Sheets

(56) References Cited

U.S. PATENT DOCUMENTS

| | | |
|---|---|---|
| 2004/0133672 A1* | 7/2004 | Bhattacharya ...... H04L 63/1416 709/224 |
| 2004/0260947 A1 | 12/2004 | Brady et al. |
| 2005/0080772 A1 | 4/2005 | Bem |
| 2005/0203881 A1 | 9/2005 | Sakamoto et al. |
| 2009/0006230 A1* | 1/2009 | Lyda ...................... G06Q 40/00 705/35 |
| 2012/0016802 A1 | 1/2012 | Zeng et al. |
| 2012/0284221 A1* | 11/2012 | Shelton ............... H04L 41/0604 706/47 |
| 2012/0311562 A1 | 12/2012 | Wang et al. |

OTHER PUBLICATIONS

Wong, A K Y, et al., Similiarty and Logic Based Ontology Mapping for Security Management, 2005, University of New South Wales, Australia, pp. 653-659. <http://aaaipress.org/Papers/FLAIRS/2005/Flairs05-107.pdf>.

Extended European Search Report, EP Application No. 13877542.4, dated Aug. 9, 2016, pp. 1-9, EPO.

* cited by examiner

EVENT CORRELATION BASED ON CONFIDENCE FACTOR

BACKGROUND

Computer networks and systems have become indispensable tools for modern business. Today terabits of information on virtually every subject imaginable are stored in and accessed across such networks by users throughout the world. Some of this information is, at least to some degree, confidential and its protection is required. Systems have been developed to help uncover attempts by unauthorized persons and/or devices to gain access to computer networks and the information stored therein.

BRIEF DESCRIPTION OF DRAWINGS

The embodiments are described in detail in the following description with reference to examples shown in the following figures.

DETAILED DESCRIPTION OF EMBODIMENTS

Figure 1:
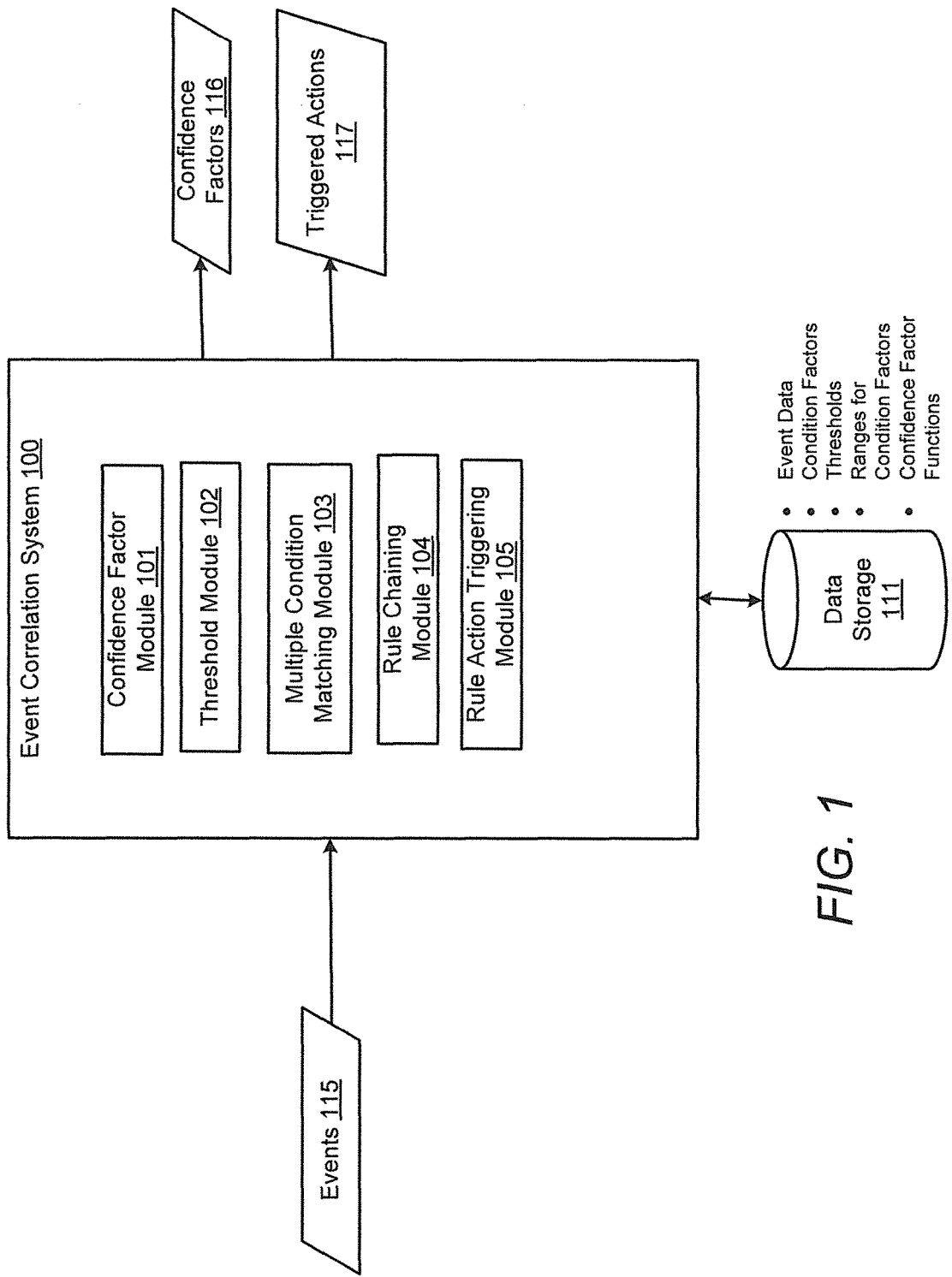
FIG. 1 illustrates an example of an event correlation system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

An event correlation system according to an example may correlate events that may be generated by one or more devices to discover certain types of activities associated with the events. Rules including conditions may be stored to correlate the events. The event correlation system can apply the rules to the events to detect certain types of activities. The event correlation system may utilize approximate event matching to determine whether events satisfy conditions of the rules. For example, the event correlation system may determine a confidence factor that indicates whether one or more events approximately satisfy a condition in a rule. In one example, the confidence factor is a value (e.g., a floating point value) that falls within a predetermined range providing a measure or estimation of whether one or more events satisfy a condition of a rule. Different functions may be used to calculate the confidence factor depending on the type of condition in the rule. According to an example, the confidence factor may be used instead of Boolean values, such as a yes or no or a "1" or a "0" that represents an absolute match or no match to a condition in a rule.

The rules including conditions may be created by users and stored and used by the event correlation system to detect activities. For example, a rule to detect an activity associated with attempts to gain unauthorized access to a computer may include the condition: 10 or more failed login attempts from the same user and from the same machine in 1 minute or less. Approximate matching by the event correlation system may provide a confidence factor that indicates an approximate match if the number of failed login attempts from the same user and from the same machine is greater than 10 but was done in 1 minute and 10 seconds. This allows detection of activities associated with the events even if the rule conditions are not exactly matched. Thus, rather than the failed login attempts going unnoticed because the attempts occurred over longer than the 1 minute time period, the approximate match may trigger an alert and/or further analysis to determine whether the activities are improper. In one example, the detected activities may be malicious activities such as attempts to gain unauthorized access to a computer network or a computer system or detection of fraudulent credit card activities. However, the activities that can be detected are not limited to malicious activities and can be any type of activities that can be detected through application of rules to events.

An event may include an activity, such as an action. The activity may occur or be performed on a computer and/or in a computer network. Event data for events may include any data related to an activity performed on a computer or in a computer network. In one example, the event data may be correlated and analyzed by the event correlation system to identify network or computer security threats. The activities of the events may be associated with a user, also referred to as an actor, to identify a security threat and the cause of the security threat. Activities may include logins, logouts, sending data over a network, sending emails, accessing applications, reading or writing data, etc. A security threat may include activities determined to be indicative of suspicious or inappropriate behavior, which may be performed over a network or on systems connected to a network. A common security threat, by way of example, is a user or code attempting to gain unauthorized access to confidential information, such as social security numbers, credit card numbers, etc., over a network.

The data sources for the event data may include network devices, applications or other types of data sources described below operable to provide event data that may be used to identify network security threats. Event data describing events may be captured in logs or messages generated by the data sources. For example, intrusion detection systems, intrusion prevention systems, vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data can include information about the device or application that generated the event. An identifier for an event source may be a network endpoint identifier (e.g., an Internet Protocol (IP) address or Media Access Control (MAC) address) and/or a description of the source, possibly including information about the product's vendor and version. The time attributes, source information and other information is used to correlate events with a user and analyze events for security threats.

FIG. 1 illustrates an example of an event correlation system 100. The event correlation system 100 may include a confidence factor module 101, a threshold module 102, a multiple condition matching module 103, a rule chaining module 104 and a rule action triggering module 105. The components of the system 100 may comprise hardware, machine readable instructions or a combination of hardware and machine readable instructions. The machine readable instructions may be stored on a non-transitory computer readable medium and executed by one or more processors.

Data storage 111 may include a database, an online analytical data storage system or another type of data storage system. The data storage 111 may include hardware, such as hard drives, memory, processing circuits, etc., for storing data and executing data storage and retrieval operations. The data storage 111 may store any information used by the event correlation system 100, such as event data for the events 115, rules for correlating events, confidences factors, functions for calculating confidence factors for different types of conditions, thresholds, ranges for confidence factors, etc. The stored event data may be from sources including computer systems. The stored event data may include fields such as source IP address, MAC address, receipt time, user ID, in-bytes, out-bytes, total bandwidth, event description, etc. Data types of the fields may include numeric ranges, a string of predetermined length, integer, etc.

The event correlation system 100 may receive the events 115 which may be from one or more sources. The events 115 may include event data including information about the events 115. The event correlation system 100 can apply rules to the events 115 to detect certain activities and may trigger actions 117, such as alerts, notifications, reports, further analysis of events, etc., in response to detection of the activities. To apply the rules, the event correlation system 100 may determine confidence factors 116. A confidence factor approximates whether a condition in a rule is satisfied. In one example, the confidence factor is a value (e.g., a floating point value) that falls within a predetermined range and provides a measure or estimation of whether one or more events satisfy a condition of a rule.

The confidence factor module 101 may calculate a confidence factor for a condition in a rule to apply the rule to an event or a set of events. Different confidence factor functions may be used to calculate confidence factors for different types of conditions. The confidence factor module 101 may determine the type of the condition and a confidence factor function may be selected based on the type of condition to calculate the confidence factor for the condition.

For example, a condition type may be for a comparison of numeric values. For example, a rule to detect fraudulent financial transactions may include the following condition: total amount transacted today being greater than $10,000.00. The confidence factor module 101 determines that the condition type is for comparison of two numeric values. The rule may specify the data types of the values to be compared, such as integers. The confidence factor module 101 determines the data types which are integers in this example and determines the condition type (e.g., numeric). The confidence factor module 101 may store an indication of the condition type in the data storage 111, and the confidence factor module 101 selects the function to calculate the confidence factor based on the numeric condition type.

In one example, for a numeric comparison, such as A>B, the range of the calculated confidence factors can be defined as [0,2] and the function for calculating the confidence factor is NB which may be set to a minimum (e.g., 0) or maximum (e.g., 2) range value in case the calculated confidence factor value is outside of the range from 0-2 inclusive. For example, if A=25,000 (e.g., total amount transacted for the day) and B=10,000, then A/B=2.5. However, 2.5 is greater than the maximum value of the range, which is 2 in this example, so the confidence factor is set to 2. Other functions may be used to compare numeric values. Depending on the rule or a source of an event or other factors, a particular function may be selected.

In another example, the confidence factor module 101 determines that a condition type for a condition is for comparison of two strings. For example, the confidence factor module 101 determines from data types specified in the rule that values to be compared for a condition are strings. The confidence factor module 101 determines a confidence factor function for string comparison such as Levenshtein distance with lower and upper limits defined. The Levenshtein distance measures the difference between two strings, such as the minimum number of single-character edits required to change one word into the other. Other string comparison functions may be used. The range for the confidence factors may be customized. For example, a user may specify a range of confidence factors. Different ranges may be selected for different functions.

The threshold module 102 may compare the confidence factor for a condition to a threshold to determine whether the condition is satisfied. The thresholds may be stored in the data storage 111. Different thresholds may be used for different rules. In the example described above with respect to the condition of total amount transacted today being greater than $10,000.00 and the function is NB, the threshold may be 0.9 so if A is $9,000.00 and B is $10,000.00 the condition may still be considered to be satisfied even though A is less than B.

The multiple condition matching module 103 may determine whether the rule includes multiple conditions, and if the rule includes multiple conditions, to invoke the confidence factor module 101 to calculate a confidence factor for each condition and to determine a multi-condition confidence factor for the rule based on the confidence factor for each condition. The multi-condition confidence factor may be compared to a threshold to determine whether the conditions for the rule are satisfied and to determine whether to trigger an action in response to the conditions being satisfied.

For example, a rule may include the following conditions to detect fraudulent transactions:
OR
  Number of transactions today being greater than 10
  AND
    Total amount transacted today being greater than maximum daily amount transacted by the user in the past six months.
    Total amount transacted today being greater than $10,000.
    Amount transacted currently being greater than $1,000.

In this example, the conditions in the AND group include the following: the total amount transacted today >maximum daily amount transacted by the user in the past six months; total amount transacted today >$10,000.00; and amount transacted currently >$1,000.00. In the absence of approximate matching performed by the event correlation system using confidence factors, all the conditions in the AND group must be satisfied or the condition of number of transactions in the day >10 must be satisfied to satisfy the rule and trigger an action if an action is specified in the rule. However, the event correlation system 100 can determine if one or more of the conditions are approximately satisfied to minimize missing the detection of certain events. For example, if the number of transactions today is equal to 10, the action for the rule may still be triggered because it is considered an approximate match for the condition number of transactions in the day >10.

The multiple condition matching module 103 invokes, for example by a function call, the confidence factor module 101 to calculate a confidence factor for each condition in the rule, including the conditions in the AND group and the other condition OR'd with the AND group condition in the example described above. The multiple condition matching module 103 may determine a multi-condition confidence factor for the rule based on the confidence factor for each condition. The multi-condition confidence factor may be compared to a threshold to determine whether the OR condition or the AND group of conditions are satisfied.

According to an example, the multiple condition matching module 103 is to determine a weight for each condition and calculate the multi-condition confidence factor based on the weights. For example, numerical weights may be stored for each condition which may be nested inside an AND group or an OR group. For example, the first condition in the AND group, which compares daily total to a historical daily maximum, is given a weight of 3, and the two other conditions are each getting a weight of 1 for example because they are considered more prone to false positives. The OR condition may be assigned a weight of 2.5, with the nested AND node being given the default weight of 1.

The multi-condition confidence factor of a Boolean AND group containing two or more conditions may be computed as the weighted multiplication of the corresponding confidence factors calculated for the conditions. For example, the weights for each condition are multiplied by the confidence factor for each condition to determine a weighted confidence factor for each condition. Then, a confidence factor may be determined for the entire AND group based on the weighted confidence factor for each condition in the AND group. For example, a maximum weighted confidence factor of the AND group may be selected as the confidence factor for the AND group or the weighted confidence factors may be multiplied to determine the weighted confidence factor for the AND group or another function may be applied to determine the confidence factor for the AND group based on the weighted confidence factor for each condition in the AND group. A range may be used for the confidence factor for the AND group. If the confidence factor for the AND group falls outside a range, the confidence factor may be set to the maximum or minimum of the range as described above. For example, the multi-condition confidence factor is limited to a range [0,1].

The multi-condition confidence factor of a Boolean OR group containing two or more conditions may be computed as the maximum value of the weighted confidence factors for each condition being OR'd or an average or the weighted confidence factors may be combined according to another function. If the confidence factor for the OR group falls outside a range, the confidence factor may be set to the maximum or minimum of the range as described above.

The multi-condition confidence factor may be compared to a threshold to determine whether the conditions for the rule are satisfied and to determine whether to trigger an action in response to the conditions being satisfied. The multi-condition confidence factor may be calculated without weights. If weights and/or ranges are used for calculation of any of the confidence factors described above, the weights and ranges may be specified by a user or calculated based on historical analysis of data.

Rules may depend on another rule being satisfied at an earlier time (e.g., an attack rule typical looks for earlier port scans). This type of dependence is referred to as rule-chaining. There could be multiple levels of rule chaining. The rule chaining module 104 may determine whether multiple rules are chained together and to determine for each next rule in the chain whether a previous rule in the chain is to trigger a next rule in the chain based on a confidence factor determined by the confidence factor module 101 and/or the multiple condition matching module 103 for each rule. For example, rules 1-3 are chained together. Rule 1 is the first rule; rule 2 is the next rule; and rule 3 is the next and last rule in the chain. The rule chaining module 104 determines for example according to a confidence factor calculated for conditions in rule 1 whether the conditions are satisfied. If the conditions are satisfied, the rule chaining module 104 may determine the next rule in the chain, e.g., rule 2, is triggered. If the conditions are satisfied for rule 2, the rule chaining module 104 may determine the next rule in the chain, e.g., rule 3, is triggered. The rule chaining module 104 may query the data storage 111 to determine whether a rule is in a rule chain and identify all the rules in the chain to determine whether each of the rules is triggered to detect an activity.

The rule action triggering module 105 identifies any actions that may be specified in a rule and determines whether to trigger the actions if the conditions for the rule are satisfied. For example, the rule action triggering module 105 may determine from the output of the threshold module 102, which compares a confidence factor to a threshold, whether a rule condition is satisfied. If the condition is satisfied, the rule action triggering module 105 determines whether the rule specifies an action, such as generate alert, trigger another rule, etc. If so, the rule action triggering module 105 may execute the action.

Figure 2:
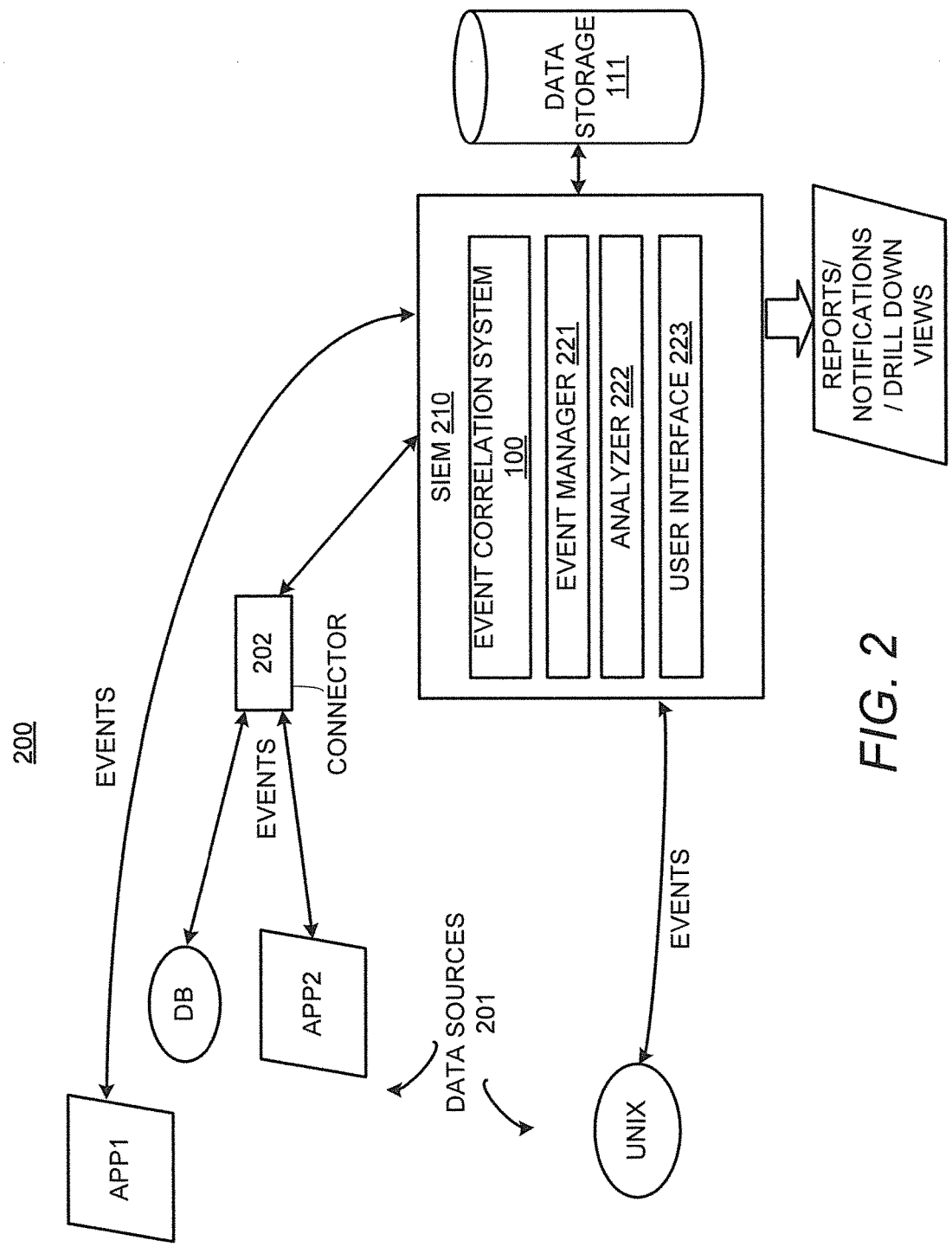
FIG. 2 illustrates an example of a security information and event management system.

FIG. 2 illustrates an environment 200 including security information and event management system (SIEM) 210, according to an example. The event correlation system 100 shown in FIG. 1 may be used in the SIEM 210. The SIEM 210 processes event data, which may include real-time event processing. The SIEM 210 may process the event data to determine network-related conditions, such as network security threats. Also, the SIEM 210 is described as a security information and event management system by way of example. The SIEM 210 is a system that may perform event data processing related to network security as an example. It is operable to perform event data processing for events not related to network security.

The environment 200 includes data sources 201 generating event data for events, which are collected by the SIEM 210 and stored in the data storage 111. The data storage 111 may include memory for performing in-memory processing and/or non-volatile storage for storing event data and performing data operations. The data storage 111 may store any data used by the SIEM 210 to correlate and analyze event data.

The data sources 201 may include network devices, applications or other types of data sources operable to provide event data that may be analyzed. Event data may be captured in logs or messages generated by the data sources 201. The data sources, for example, may include network switches, intrusion prevention systems (IPSs), vulnerability assessment tools, anti-virus tools, anti-spam tools, encryption tools, and business applications. Event data is retrieved for example from data source logs and stored in the data storage 111. Event data may be provided, for example, by entries in a log file or a syslog server, alerts, alarms, network packets, emails, or notification pages. The data sources 201 may send messages to the SIEM 210 including event data.

Event data can include information about the source that generated the event and information describing the event. For example, the event data may identify the event as a user login. Other information in the event data may include when the event was received from the event source ("receipt time"). The receipt time is a date/time stamp. The event data may describe the source, such as an event source is a network endpoint identifier (e.g., an IP address or MAC address) and/or a description of the source, possibly including information about the product's vendor and version. The date/time stamp, source information and other information may then be used for correlation performed by the event correlation system 100. The event data may include meta data for the event, such as when it took place, where it took place, the user involved, etc.

Examples of the data sources 201 are shown in FIG. 1 as Database (DB), UNIX, App1 and App2. DB and UNIX are systems that include network devices, such as servers, and generate event data. App1 and App2 are applications that generate event data. App1 and App2 may be business applications, such as financial applications for credit card and stock transactions, information technology applications, human resource applications, or any other type of application.

Other examples of data sources 201 may include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices include routers and switches. Examples of encryption devices include data security and integrity. Examples of physical security systems include card-key readers, biometrics, burglar alarms, and fire alarms. Other data sources may include data sources that are unrelated to network security.

The connector 202 may include code comprised of machine readable instructions that provide event data from a data source to the SIEM 210. The connector 202 may provide efficient, real-time (or near real-time) local event data capture and filtering from one or more of the data sources 201. The connector 202, for example, collects event data from event logs or messages. The collection of event data is shown as "EVENTS" describing event data from the data sources 201 that is sent to the SIEM 210. Connectors may not be used for all the data sources 201.

The SIEM 210 collects and analyzes the event data. Event manager 221 stores the event data from the data sources 201 in the data storage 111. Events can be cross with rules by the event correlation system 100 to determine whether to trigger certain actions which may be specified by the rules. Correlation includes, for example, discovering the relationships between events, inferring the significance of those relationships, e.g., by generating meta events, prioritizing the events and meta-events, and providing a framework for taking action. The SIEM 210, which in one example is comprised of machine readable instructions executed by computer hardware such as a processor, enables aggregation, correlation, detection, and investigative tracking of activities. The system also supports response management, ad-hoc query resolution, reporting and replay for forensic analysis, and graphical visualization of network threats and activity.

The analyzer 222 examines received events to determine which (if any) of the various rules being processed in the SIEM 210 may be implicated by a particular event or events. A rule is considered to be implicated if an event under test has one or more attributes that satisfy, or potentially could satisfy, one or more rules. For example, a rule can be considered implicated if the event under test has a particular source address from a particular subnet that meets conditions of the rule. Events may remain of interest in this sense only for designated time intervals associated with the rules and so by knowing these time windows the analyzer 222 can store and discard events as warranted. Any interesting events may be grouped together and subjected to further processing by the analyzer 222.

The SIEM 210 may include may include hardware and/or machine readable instructions executed by hardware, such as one or more processors. The event correlation system 100 processes events according to rules and instructions, which may be stored in the data storage 111. The event correlation system 100, for example, correlates events in accordance with rules, instructions and/or requests. For example, a rule indicates that multiple failed logins from the same user on different machines performed simultaneously or within a short period of time is to generate an alert to a system administrator. The event correlation system 100 may provide the time, location, and user correlations between multiple events when applying the rules.

The user interface 223 may be used for communicating or displaying reports or notifications about events and event processing to users. The user interface 223 may provide a dashboard for a user to interact with the SIEM 210 and present requested information. The user interface 223 may include a graphic user interface that may be web-based. The user interface 223 may be used as the user interface for the event correlation system 100 to enter thresholds, ranges, and other information used by the event correlation system 100.

Figure 3:
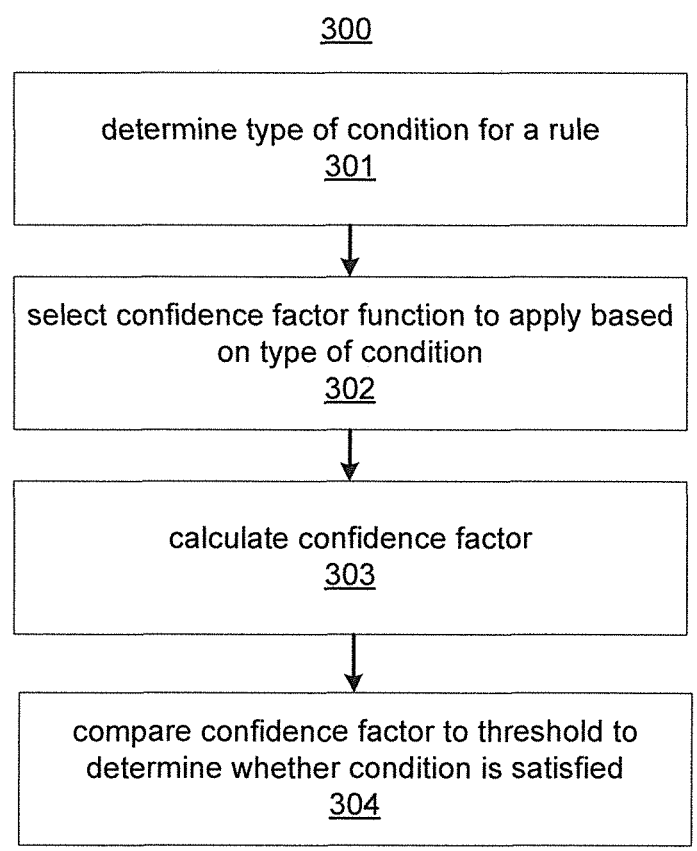
FIG. 3 illustrates an example of a method to correlate events.

FIG. 3 illustrates a method 300 according to an example. The method 300 is described with respect to the event correlation system 100 shown in FIGS. 1 and 2 by way of example. The method 300 may be performed in other systems.

At 301, the event correlation system 100 determines a type of a condition for a rule. For example, the confidence factor module 101 identifies a condition in a rule to be applied to stored events to determine whether the events are indicative of certain activities. The confidence factor module 101 determines the type of the condition for example from a data type of values to be compared for the condition. Examples of the condition type may include numeric, strings, etc.

At 302, the event correlation system 100 selects a confidence factor function to apply based on the type of the condition and at 303 calculates a confidence factor according to the selected confidence factor function. The confidence factor may be an approximation of whether an event or a set of events in the data storage 111 satisfies the condition in the rule. Examples of confidence factor functions for numeric and string types are described above. An approximation may be an estimation of whether a condition is satisfied. For example, if a condition is A>B then the condition is satisfied if A>B. However, if A is equal to or less than B, the condition may still be estimated as being satisfied based on the confidence factor. The confidence factor may be used to determine a range where A<B but is still estimated as satisfying the condition because the values of A and B are not that far apart. The confidence factor may be used to estimate that a condition is satisfied when it is close to being satisfied but is not exactly satisfied. Examples of using a confidence factor to determine a range of values that do not exactly satisfy the condition but are estimated as satisfying the condition are described above.

At 304, the event correlation system 100 compares the confidence factor to a threshold to determine whether the condition is satisfied. For example, if the confidence factor is greater than or equal to the threshold, the condition may be satisfied. If the condition is satisfied, an action may be triggered that is associated with the condition as specified in the rule.

Figure 4:
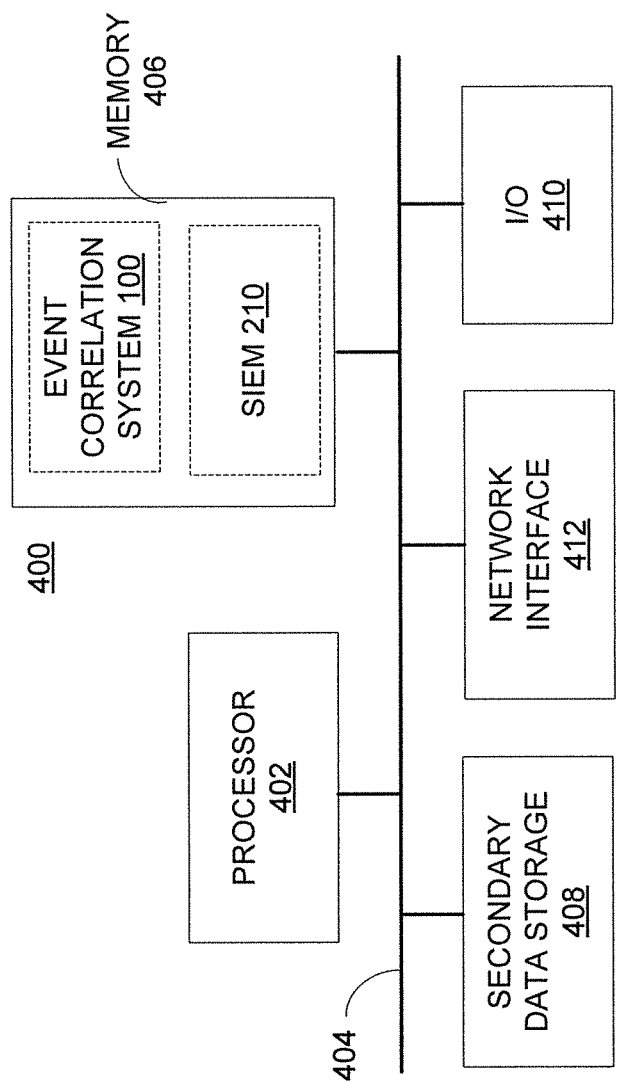
FIG. 4 illustrates an example of a computer system that may be used for the method and systems.

FIG. 4 shows a computer system 400 that may be used with the embodiments and examples described herein. The computer system 400 includes components that may be in a server or another computer system. The computer system 400 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes at least one processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. For example, machine readable instructions for the event correlation system 100 or the SIEM 210 which may include the event correlation system 100 may reside in the memory 406 during runtime. The memory 406 and secondary data storage 408 are examples of computer readable mediums.

The computer system 400 may include an I/O device 410, such as a keyboard, a mouse, a display, etc. For example, the I/O device 410 includes a display to display drill down views and other information described herein. The computer system 400 may include a network interface 412 for connecting to a network. Other known electronic components may be added or substituted in the computer system 400. Also, the event correlation system 100 and/or the SIEM 210 may be implemented in a distributed computing environment, such as a cloud system.

While the embodiments have been described with reference to examples, various modifications to the described embodiments may be made without departing from the scope of the claimed embodiments.

What is claimed is:

1. An event correlation system comprising:
a hardware processor; and
a hardware non-transitory machine readable medium storing instructions to:
determine a type of a condition for a rule,
select, from among different confidence factor functions, a confidence factor function to apply based on the type of the condition,
calculate a confidence factor according to the selected confidence factor function, wherein the confidence factor is an approximation of whether an event or a set of events satisfies the condition in the rule, wherein the events or set of events are provided in a log file, and
compare the confidence factor to a threshold to determine whether the condition is satisfied.

2. The event correlation system of claim 1, wherein the machine readable medium stores instructions to:
determine whether the rule includes multiple conditions, and
in response to a determination that the rule includes multiple conditions, calculate a confidence factor for each condition and determine a multi-condition confidence factor for the rule based on the confidence factor for each condition.

3. The event correlation system of claim 2, wherein the machine readable medium stores instructions to:
determine a weight for each condition and calculate the multi-condition confidence factor by combining confidence factors calculated for each condition weighted by their respective weights.

4. The event correlation system of claim 3, wherein the machine readable medium stores instructions to:
calculate weighted confidence factors by respectively multiplying the confidence factor calculated for each condition by the weight for each condition,
determine whether, according to the rule, the conditions are to be combined by a Boolean AND or combined by a Boolean OR,
in response to a determination that the conditions are to be combined according to the Boolean AND, apply a first function to the weighted confidence factors to determine the multi-confidence factor, and
in response to a determination that the conditions are to be combined according to the Boolean OR, apply a second function to the weighted confidence factors to determine the multi-confidence factor.

5. The event correlation system of claim 4, wherein the first function includes determining a maximum confidence factor for the weighted confidence factors and the second function includes multiplying the weighted confidence factors.

6. The event correlation system of claim 1, wherein the machine readable medium stores instructions to:
determine whether multiple rules are chained, and
determine for each chained rule whether the chained rule is triggered based on a confidence factor determined for a previous rule in the chain.

7. The event correlation system of claim 1, wherein types of the condition include a comparison of numeric values and a comparison of strings, and a different range of confidence factors is applied for each type of condition.

8. The event correlation system of claim 7, wherein the machine readable medium stores instructions to:
determine the confidence factor in the range for the type of condition,
set the confidence factor to a maximum value of the range if the determined confidence factor exceeds the range, and
set the confidence factor to a minimum value of the range if the determined confidence factor falls below the range.

9. The event correlation system of claim 7, wherein if the type of the condition is the comparison of numeric values, the selected confidence factor function includes dividing one of the numeric values by another one of the numeric values.

10. The event correlation system of claim 7, wherein if the type of the condition is the comparison of strings, the selected confidence factor function includes a string similarity comparison function.

11. The event correlation system of claim 1, wherein the events include security events and
the machine readable medium stores instructions to determine whether to trigger an action in the rule in response to a determination that the condition is satisfied based on the comparison of the confidence factor to the threshold.

12. The event correlation system of claim 1, wherein the event correlation system is included in a security information and event management system (SIEM).

13. The event correlation system of claim 1, wherein the machine readable medium stores instructions to select the rule from among a plurality of rules in response to a determination that the rule is implicated by the event of the set of events.

14. A non-transitory computer readable medium comprising machine readable instructions executable by at least one processor to:
determine a type of a condition for a rule;
select, from among different confidence factor functions, a confidence factor function to apply based on the type of the condition;
calculate a confidence factor according to the selected confidence factor function, wherein the confidence factor is an approximation of whether an event or a set of events satisfies the condition in the rule, wherein the events or set of events are provided in a log file; and
compare the confidence factor to a threshold to determine whether the condition is satisfied.

15. The non-transitory computer readable medium of claim 14, wherein the confidence factor function selected when the type of condition is a comparison of numeric values is different from the confidence factor function selected when the type of condition is a comparison of strings.

16. The non-transitory computer readable medium of claim 14, further comprising machine readable instructions executable by the at least one processor to:
determine that the rule includes multiple conditions;
calculate a confidence factor for each condition of the multiple conditions;
determining a weight for each condition;
calculate weighted confidence factors by multiplying the confidence factor for each condition by the weight for each condition, respectively; and
determining a maximum confidence factor of the weighted confidence factors to be a multi-condition confidence factor if the multiple conditions are to be combined according to the rule by a Boolean AND, and
multiplying the weighted confidence factors to provide the multi-condition confidence factor if the multiple conditions are to be combined according to the rule by a Boolean OR.

17. A method comprising:
determining, by a hardware-based event correlation system, a type of a condition for a rule;
selecting, by the event correlation system, a confidence factor function from among different confidence factor functions based on the type of the condition;
calculating, by the event correlation system using the selected confidence factor function, a confidence factor that estimates whether an event or a set of events satisfies the condition in the rule, wherein the events or set of events are provided in a log file; and
comparing, by the event correlation system, the confidence factor to a threshold to determine whether the condition is satisfied.

18. The method of claim 17, comprising:
determining that the rule includes multiple conditions;
calculating a confidence factor for each condition of the multiple conditions;
determining a multi-condition confidence factor for the rule based on the confidence factor for each condition.

19. The method of claim 18, comprising:
determining a weight for each condition;
calculating weighted confidence factors by multiplying the confidence factor for each condition by the weight for each condition, respectively; and
calculating the multi-condition confidence factor by combining the weighted confidence factors.

20. The method of claim 19, wherein the calculating the multi-condition confidence factor by combining the weighted confidence factors includes:
determining a maximum confidence factor of the weighted confidence factors to be the multi-condition confidence factor if the multiple conditions are to be combined according to the rule by a Boolean AND, and
multiplying the weighted confidence factors to provide the multi-condition confidence factor if the multiple conditions are to be combined according to the rule by a Boolean OR.

* * * * *